(12) United States Patent
Kitsukawa et al.

(10) Patent No.: US 12,032,051 B2
(45) Date of Patent: Jul. 9, 2024

(54) RADAR DEVICE

(71) Applicant: Mitsubishi Electric Corporation, Tokyo (JP)

(72) Inventors: Yusuke Kitsukawa, Tokyo (JP); Masashi Mitsumoto, Tokyo (JP); Toru Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 889 days.

(21) Appl. No.: 17/025,897

(22) Filed: Sep. 18, 2020

(65) Prior Publication Data

US 2021/0003689 A1    Jan. 7, 2021

Related U.S. Application Data (63) Continuation of application No. PCT/JP2018/019861, filed on May 23, 2018.

(51) Int. Cl.
*G01S 13/34* (2006.01)
*G01S 7/35* (2006.01)
*G01S 13/58* (2006.01)

(52) U.S. Cl.
CPC .............. *G01S 13/34* (2013.01); *G01S 7/352* (2013.01); *G01S 13/583* (2013.01); *G01S 7/356* (2021.05)

(58) Field of Classification Search
CPC ........ G01S 13/34; G01S 7/352; G01S 13/583; G01S 7/356; G01S 13/22; G01S 13/282; G01S 13/582; G01S 7/0235
See application file for complete search history.

(56) References Cited

U.S. PATENT DOCUMENTS

| | | | |
|---|---|---|---|
| 6,861,977 B2* | 3/2005 | Erkocevic-Pribic | ............ G01S 13/225 342/19 |
| 7,466,260 B2* | 12/2008 | Ishii | .............. G01S 13/345 342/70 |
| 7,768,445 B2* | 8/2010 | Inaba | ................ G01S 7/023 342/112 |
| 2009/0278727 A1 | 11/2009 | Inaba | |
| 2011/0074620 A1 | 3/2011 | Wintermantel | |
| 2012/0176266 A1 | 7/2012 | Lee et al. | |
| 2013/0257643 A1 | 10/2013 | Inomata et al. | |
| 2016/0124075 A1 | 5/2016 | Vogt et al. | |

(Continued)

FOREIGN PATENT DOCUMENTS

| JP | 2011-526373 A | 10/2011 |
|---|---|---|
| JP | 2013-213761 A | 10/2013 |
| JP | 6109416 B2 | 4/2017 |

(Continued)

OTHER PUBLICATIONS

V. Winkler, "Range Doppler detection for automotive FMCW radars," 2007 European Radar Conference, Munich, Germany, 2007, pp. 166-169, doi: 10.1109/EURAD.2007.4404963. (Year: 2007).*

(Continued)

*Primary Examiner* — Olumide Ajibade Akonai
*Assistant Examiner* — Yonghong Li
(74) *Attorney, Agent, or Firm* — Birch, Stewart, Kolasch & Birch, LLP (57) ABSTRACT

A radar device includes a radar signal outputting unit that repeatedly outputs radar signals whose frequency changes with the passage of time, at a non-uniform repetition period.

8 Claims, 7 Drawing Sheets

(56) References Cited

U.S. PATENT DOCUMENTS

2017/0131394 A1* 5/2017 Roger .................. G01S 13/343

FOREIGN PATENT DOCUMENTS

| JP | 2018-59828 A | | 4/2018 |
| JP | 2018059828 A | * | 4/2018 |
| WO | WO 2006/013615 A1 | | 2/2006 |
| WO | WO 2014/195046 A1 | | 12/2014 |

OTHER PUBLICATIONS

JP2018059828A_Description_20240229_1624.pdf—translate of JP2018059828A (Year: 2018).*
International Search Report for PCT/JP2018/019861 filed on May 23, 2018, mailed on Aug. 7, 2018.

* cited by examiner

RADAR DEVICE

CROSS REFERENCE TO RELATED APPLICATION

This application is a Continuation of PCT International Application No. PCT/JP2018/019861, filed on May 23, 2018, which is hereby expressly incorporated by reference into the present application.

TECHNICAL FIELD

The invention relates to a radar device for calculating a relative velocity against an observation target.

BACKGROUND ART

A frequency modulated continuous wave (FMCW) radar device repeatedly transmits transmission chirp signals, each of which is frequency modulated with the passage of time, to an observation target.

The FMCW radar device repeatedly receives, as reception chirp signal, reflected waves of the transmission chirp signals reflected by the observation target, and mixes together the frequencies of each transmission chirp signal and a corresponding reception chirp signal and thereby generates beat signals.

The FMCW radar device calculates a range to the observation target by performing a Fourier transform on each beat signal in a range direction.

In addition, the FMCW radar device calculates a relative velocity against the observation target by performing a Fourier transform on a plurality of beat signals in a Doppler direction.

Note, however, that when chirp signals similar to the transmission chirp signals are transmitted from another radar device, the FMCW radar device may receive the chirp signals from the another radar device, as interference signals.

When the FMCW radar device receives the interference signals, the FMCW radar device generates beat signals by mixing together the frequencies of the transmission chirp signals and the interference signals, and calculates a relative velocity against the another radar device from the beat signals.

Therefore, as a relative velocity against the observation target, a relative velocity against the another radar device may be erroneously detected.

The following Patent Literature 1 discloses a radar system that prevents erroneous detections.

The radar system disclosed in Patent Literature 1 includes a plurality of radar sensors.

Different code sequences are set to the plurality of radar sensors.

By focusing on any one of the plurality of radar sensors, an operation of the radar sensor will be described below.

The radar sensor modulates the phase of each transmission chirp signal which is repeatedly transmitted, in accordance with a code sequence set to the radar sensor, and radiates each phase-modulated transmission chirp signal into space.

The radar sensor repeatedly receives, as a reception chirp signal, a reflected wave of each transmission chirp signal reflected by an observation target.

The radar sensor demodulates each reception chirp signal which is repeatedly received, in accordance with the code sequence set to the radar sensor.

The radar sensor mixes together the frequencies of each transmission chirp signal before being subjected to phase modulation and a corresponding demodulated reception chirp signal, and thereby generates a beat signal.

The radar sensor calculates a frequency spectrum by performing a Fourier transform on a plurality of beat signals in the Doppler direction.

Here, the code sequence used by the radar sensor to demodulate reception chirp signals is identical to the code sequence used to modulate the phases of transmission chirp signals transmitted from the radar sensor itself.

In addition, the code sequence used by the radar sensor to demodulate reception chirp signals is different from a code sequence used by another radar sensor to modulate the phases of transmission chirp signals.

Therefore, when the radar sensor calculates a plurality of frequency spectra by repeatedly receiving a reception chirp signal corresponding to a transmission chirp signal transmitted from the radar sensor itself, spectral values are summed up at a Doppler frequency corresponding to a relative velocity against the observation target.

Even when the radar sensor calculates a plurality of frequency spectra by repeatedly receiving a transmission chirp signal from another radar sensor, spectral values are not summed up at the same frequency.

Thus, since the spectral value of a Doppler frequency corresponding to a relative velocity against another radar sensor is smaller than the spectral value of a Doppler frequency corresponding to a relative velocity against the observation target, the radar sensor can prevent erroneous detections.

CITATION LIST

Patent Literature

Patent Literature 1: WO 2014/195046 A

SUMMARY OF INVENTION

Technical Problem

In the radar system disclosed in Patent Literature 1, even when the radar sensor calculates a plurality of frequency spectra by receiving transmission chirp signals from another radar sensor, spectral values are not added up to the same frequency.

However, a beat frequency obtained when the radar sensor receives a reception chirp signal corresponding to a transmission chirp signal transmitted from the radar sensor itself may be identical or close to a beat frequency obtained when the radar sensor receives a transmission chirp signal from another radar sensor. For example, if transmission chirp signals from the radar sensor and another radar sensor have the same transmission timing, then when the range from the radar sensor to the observation target is one-half of the range from the radar sensor to another radar sensor, beat frequencies of the radar sensor and another radar sensor are identical to each other.

When the beat frequencies of the radar sensor and another radar sensor are identical or close to each other, the spectral values of a plurality of frequency spectra calculated by repeatedly receiving a transmission chirp signal from another radar sensor serve as floor noise for the spectral value of a Doppler frequency corresponding to relative velocity against the observation target.

In a situation in which floor noise increases, it becomes difficult for the radar sensor to detect a spectral value corresponding to a Doppler frequency related to the observation target out of the frequency spectra, causing a problem that relative velocity against the observation target cannot be calculated.

Embodiments of this disclosure are made to solve a problem such as that described above, and an object of embodiments is to obtain a radar device that can calculate a relative velocity against an observation target by avoiding a situation in which floor noise increases.

Solution To Problem

A radar device according to the disclosure includes: processing circuitry to repeatedly output radar signals whose frequency changes with passage of time, at a non-uniform repetition period; to transmit each radar signal outputted from the radar signal outputting unit to an observation target, and receive each radar signal reflected by the observation target as a reflected wave; to generate a plurality of beat signals each having a frequency, the frequency being a difference between a frequency of each outputted radar signal and a frequency of a corresponding reflected wave; and to calculate a Doppler frequency from the plurality of beat signals, and calculate a relative velocity against the observation target from the Doppler frequency, wherein the processing circuitry is configured to determine a change range of the repetition period on a basis of both an amount of phase variation for a radar signal to be repeatedly outputted at a non-uniform repetition period and a frequency that is a difference between a frequency of the radar signal and a frequency of a radar signal from another radar device, and repeatedly output a radar signal at a repetition period that changes non-uniformly in the determined change range.

Advantageous Effects of Invention

According to the invention, the radar device is configured to include the radar signal outputting unit for repeatedly outputting radar signals whose frequency changes with the passage of time, at a non-uniform repetition period. Therefore, the radar device according to the invention can calculate a relative velocity against an observation target by avoiding a situation in which floor noise increases.

BRIEF DESCRIPTION OF DRAWINGS

FIG. 4 is a hardware configuration diagram of a computer in a case where the signal processing unit 12 is implemented by software, firmware, or the like.

FIG. 5 is a flowchart showing a processing procedure performed in a case where the signal processing unit 12 is implemented by software, firmware, or the like.

DESCRIPTION OF EMBODIMENTS

To describe the invention in more detail, embodiments for carrying out the invention will be described below by referring to the accompanying drawings.

First Embodiment

Figure 1:
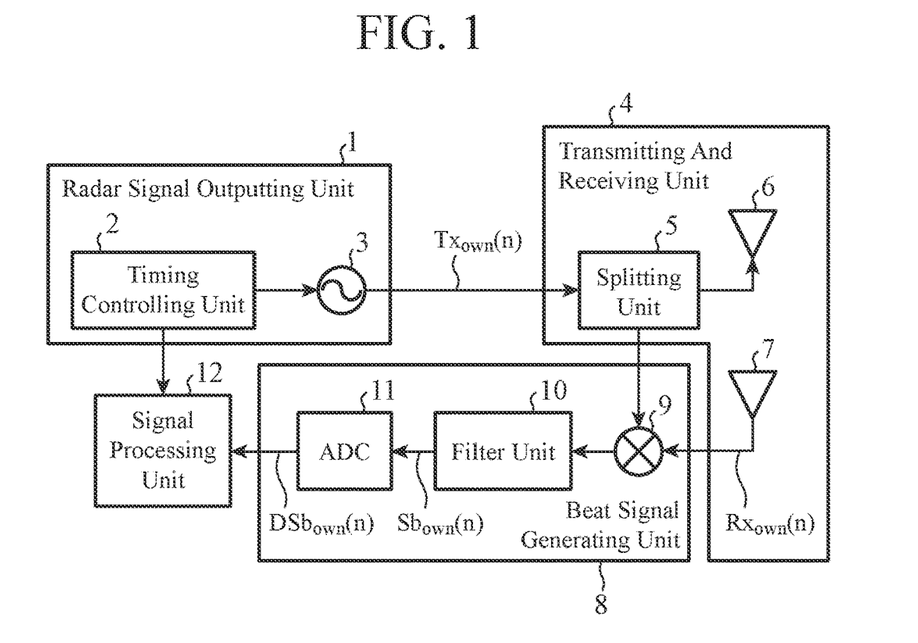
FIG. 1 is a configuration diagram showing a radar device according to a first embodiment.

FIG. 1 is a configuration diagram showing a radar device according to a first embodiment.

In FIG. 1, a radar signal outputting unit 1 includes a timing controlling unit 2 and a signal source 3.

The radar signal outputting unit 1 repeatedly outputs radar signals whose frequency changes with the passage of time (hereinafter, referred to as "transmission chirp signal") to a splitting unit 5 at a non-uniform repetition period.

The timing controlling unit 2 outputs a control signal indicating transmission timing of the transmission chirp signal to each of the signal source 3 and a signal processing unit 12.

Repetition periods of transmission timing indicated by the control signal outputted from the timing controlling unit 2 are non-uniform.

The signal source 3 outputs a transmission chirp signal $Tx_{own}(n)$ (n=1, 2, . . . , k) to the splitting unit 5 at each transmission timing indicated by the control signal outputted from the timing controlling unit 2. The "k" is the number of repetitions of transmission.

A transmitting and receiving unit 4 includes the splitting unit 5, a transmission antenna 6, and a reception antenna 7.

The transmitting and receiving unit 4 transmits the transmission chirp signal $Tx_{own}(n)$ outputted from the signal source 3 to an observation target, and receives the transmission chirp signal $Tx_{own}(n)$ reflected by the observation target, as a reflected wave.

The splitting unit 5 splits the transmission chirp signal $Tx_{own}(n)$ outputted from the signal source 3 into two signals, and outputs one split transmission chirp signal $Tx_{own}(n)$ to the transmission antenna 6, and outputs the other split transmission chirp signal $Tx_{own}(n)$ to a frequency mixing unit 9.

The transmission antenna 6 radiates the transmission chirp signal $Tx_{own}(n)$ outputted from the splitting unit 5, as an electromagnetic wave, into space.

The reception antenna 7 receives the electromagnetic wave reflected by the observation target, as a reflected wave, and outputs the received reflected wave as a reception chirp signal $Rx_{own}(n)$ to the frequency mixing unit 9.

A beat signal generating unit 8 includes the frequency mixing unit 9, a filter unit 10, and an analog to digital converter (ADC) 11.

The beat signal generating unit 8 generates a beat signal $Sb_{own}(n)$ having a frequency which is a difference between the frequency of the transmission chirp signal $Tx_{own}(n)$ outputted from the splitting unit 5 and the frequency of the reception chirp signal $Rx_{own}(n)$ outputted from the reception antenna 7.

The beat signal generating unit 8 outputs digital data $DSb_{own}(n)$ of the beat signal $Sb_{own}(n)$ to the signal processing unit 12.

The frequency mixing unit 9 mixes together the frequencies of the transmission chirp signal $Tx_{own}(n)$ outputted from the splitting unit 5 and the reception chirp signal $Rx_{own}(n)$ outputted from the reception antenna 7, and thereby generates a beat signal $S'b_{own}(n)$.

The frequency mixing unit 9 outputs the beat signal $S'b_{own}(n)$ to the filter unit 10.

The filter unit 10 suppresses unwanted components such as noise included in the beat signal $S'b_{own}(n)$ outputted from the frequency mixing unit 9, and outputs a beat signal $Sb_{own}(n)$ obtained after the suppression of unwanted components to the ADC 11.

The ADC 11 converts the beat signal $Sb_{own}(n)$ outputted from the filter unit 10 into digital data $DSb_{own}(n)$, and outputs the digital data $DSb_{own}(n)$ to the signal processing unit 12.

The signal processing unit 12 includes a first spectrum calculating unit 21, a second spectrum calculating unit 22, and a range and velocity calculation processing unit 23.

The signal processing unit 12 performs a process of calculating a range to the observation target in synchronization with transmission timing indicated by the control signal outputted from the timing controlling unit 2.

Namely, the signal processing unit 12 obtains digital data $DSb_{own}(n)$ corresponding to a transmission chirp signal $Tx_{own}(n)$ present in one period from the ADC 11 in synchronization with transmission timing indicated by the control signal.

The signal processing unit 12 performs a process of calculating a first frequency spectrum by performing a Fourier transform on the obtained digital data $DSb_{own}(n)$ in a range direction, and calculating a range to the observation target from the first frequency spectrum.

In addition, the signal processing unit 12 performs a process of calculating a second frequency spectrum by performing a Fourier transform on first frequency spectra in a Doppler direction, and calculating a relative velocity against the observation target from the second frequency spectrum.

The radar device shown in FIG. 1 does not have an amplifier mounted thereon, but an amplifier may be mounted on, for example, an input side of the transmission antenna 6 or an output side of the reception antenna 7.

Figure 2:
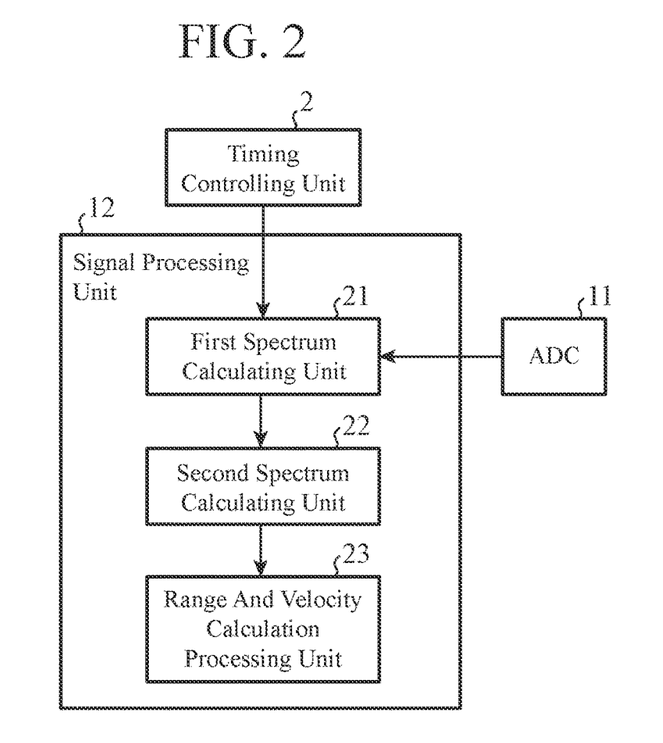
FIG. 2 is a configuration diagram showing the inside of a signal processing unit 12.

FIG. 2 is a configuration diagram showing the inside of the signal processing unit 12.

Figure 3:
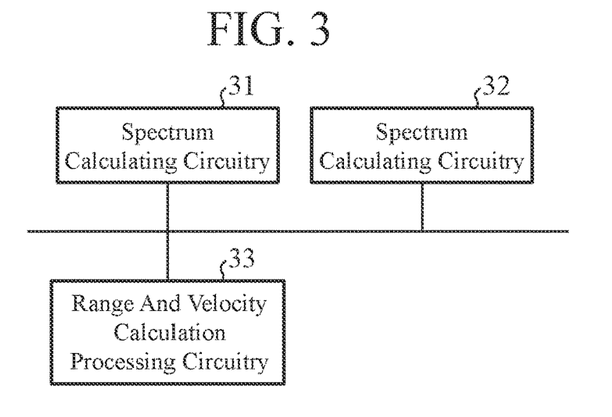
FIG. 3 is a hardware configuration diagram showing hardware for the signal processing unit 12.

FIG. 3 is a hardware configuration diagram showing hardware for the signal processing unit 12.

In FIG. 2, the first spectrum calculating unit 21 is implemented by, for example, spectrum calculating circuitry 31 shown in FIG. 3.

The first spectrum calculating unit 21 obtains digital data $DSb_{own}(n)$ corresponding to a transmission chirp signal $Tx_{own}(n)$ present in one period from the ADC 11 in synchronization with transmission timing indicated by a control signal outputted from the timing controlling unit 2.

The first spectrum calculating unit 21 performs a process of calculating a first frequency spectrum by performing a Fourier transform on the obtained digital data $DSb_{own}(n)$ in the range direction, and outputting the first frequency spectrum to the second spectrum calculating unit 22.

The second spectrum calculating unit 22 is implemented by, for example, spectrum calculating circuitry 32 shown in FIG. 3.

The second spectrum calculating unit 22 calculates second frequency spectra by performing a Fourier transform on k first frequency spectra outputted from the first spectrum calculating unit 21, in the Doppler direction.

The second spectrum calculating unit 22 performs a process of outputting the first frequency spectra and the second frequency spectra to the range and velocity calculation processing unit 23.

The range and velocity calculation processing unit 23 is implemented by, for example, range and velocity calculation processing circuitry 33 shown in FIG. 3.

The range and velocity calculation processing unit 23 performs a process of calculating a range to the observation target from the first frequency spectra outputted from the second spectrum calculating unit 22.

The range and velocity calculation processing unit 23 performs a process of calculating a relative velocity against the observation target from the second frequency spectra outputted from the second spectrum calculating unit 22.

In FIG. 2, it is assumed that each of the first spectrum calculating unit 21, the second spectrum calculating unit 22, and the range and velocity calculation processing unit 23 which are components of the signal processing unit 12 is implemented by dedicated hardware such as that shown in FIG. 3. Namely, it is assumed that the signal processing unit 12 is implemented by the spectrum calculating circuitry 31, the spectrum calculating circuitry 32, and the range and velocity calculation processing circuitry 33.

Here, each of the spectrum calculating circuitry 31, the spectrum calculating circuitry 32, and the range and velocity calculation processing circuitry 33 is embodied, for example, by a single circuit, a combined circuit, a programmed processor, a parallel programmed processor, an application specific integrated circuit (ASIC), a field-programmable gate array (FPGA), or a combination thereof.

The components of the signal processing unit 12 are not limited to those being implemented by dedicated hardware, and the signal processing unit 12 may be implemented by software, firmware, or a combination of software and firmware.

The software or firmware is stored as a program in a memory of a computer. The computer means hardware that executes programs and is, for example, a central processing unit (CPU), a central processor, a processing unit, an arithmetic unit, a microprocessor, a microcomputer, a processor, or a digital signal processor (DSP).

Figure 4:
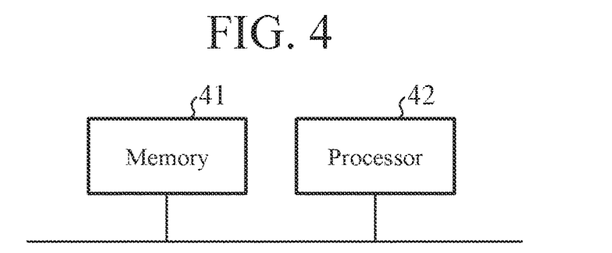

FIG. 4 is a hardware configuration diagram of a computer for a case in which the signal processing unit 12 is implemented by software, firmware, or the like.

In a case in which the signal processing unit 12 is implemented by software, firmware, or the like, a program for causing the computer to perform a processing procedure of the first spectrum calculating unit 21, the second spectrum calculating unit 22, and the range and velocity calculation processing unit 23 is stored in a memory 41. Then, a processor 42 of the computer executes the program stored in the memory 41.

Figure 5:
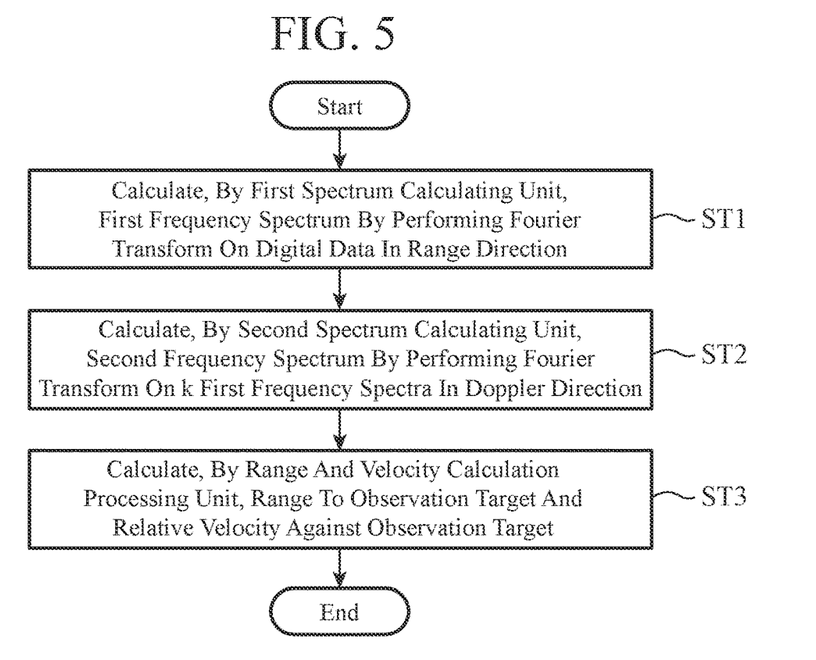

FIG. 5 is a flowchart showing a processing procedure performed when the signal processing unit 12 is implemented by software, firmware, or the like.

In addition, although FIG. 3 shows an example in which each of the components of the signal processing unit 12 is implemented by dedicated hardware and FIG. 4 shows an example in which the signal processing unit 12 is implemented by software, firmware, or the like, one of the components of the signal processing unit 12 may be implemented by dedicated hardware and the other components may be implemented by software, firmware, or the like.

Next, the radar device shown in FIG. 1 will be described.

First, to clarify functions of the radar device shown in FIG. 1, a relationship between Doppler frequencies and beat frequencies which are calculated by a radar system disclosed in Patent Literature 1 will be described.

Figure 6:
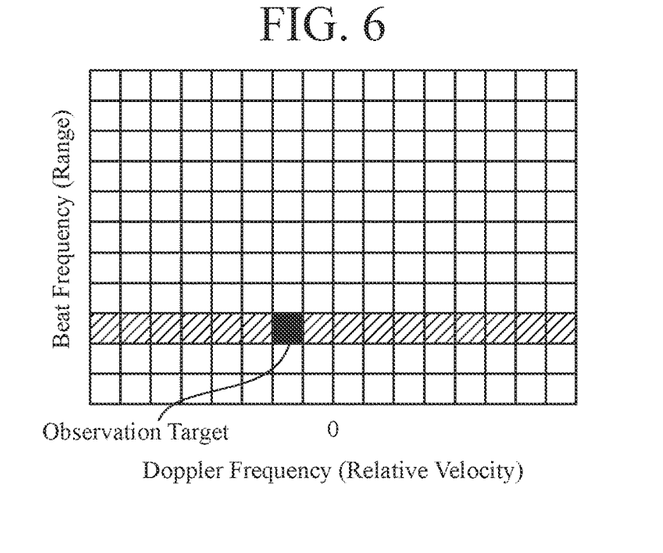
FIG. 6 is an explanatory diagram showing an example of a two-dimensional spectrum of Doppler frequency and beat frequency which are calculated by a radar system disclosed in Patent Literature 1.

FIG. 6 is an explanatory diagram showing an example of a two-dimensional spectrum of Doppler frequency and beat frequency which are calculated by the radar system disclosed in Patent Literature 1.

The two-dimensional spectrum shown in FIG. 6 is a two-dimensional spectrum obtained in a situation in which the range from a radar sensor to an observation target is one-half of the range from the radar sensor to another radar sensor.

In the first embodiment, for convenience of description, it is assumed that transmission timing of a transmission chirp signal of the radar sensor and transmission timing of a transmission chirp signal of another radar sensor are identical to each other.

In FIG. 6, a blackened frequency is a Doppler frequency corresponding to relative velocity against the observation target.

Frequencies hatched with diagonal lines are frequencies related to a plurality of frequency spectra calculated by the radar sensor repeatedly receiving a transmission chirp signal from another radar sensor.

Different code sequences are set to the radar sensors. Therefore, even when the radar sensor calculates a plurality of frequency spectra by repeatedly receiving a transmission chirp signal from the another radar sensor, spectral values are spread without being summed up to the same frequency.

Note, however, that since the range from the radar sensor to the observation target is one-half of the range from the radar sensor to the another radar sensor, a beat frequency related to the observation target and a beat frequency related to the another radar sensor are identical to each other.

Therefore, the spectral values of a plurality of frequency spectra calculated by repeatedly receiving a transmission chirp signal from the another radar sensor serve as floor noise for the spectral value of the Doppler frequency corresponding to the relative velocity against the observation target.

The timing controlling unit 2 outputs a control signal indicating transmission timing of a transmission chirp signal $Tx_{own}(n)$ (n=1, 2, . . . , k) to each of the signal source 3 and the signal processing unit 12. The "k" is the number of repetitions of transmission.

Repetition period $Tr_{own}(n)$ of transmission timing indicated by the control signal outputted from the timing controlling unit 2 is non-uniform.

When the signal source 3 receives the control signal from the timing controlling unit 2, the signal source 3 outputs a transmission chirp signal $Tx_{own}(n)$ to the splitting unit 5 at each transmission timing indicated by the control signal.

Figure 7:
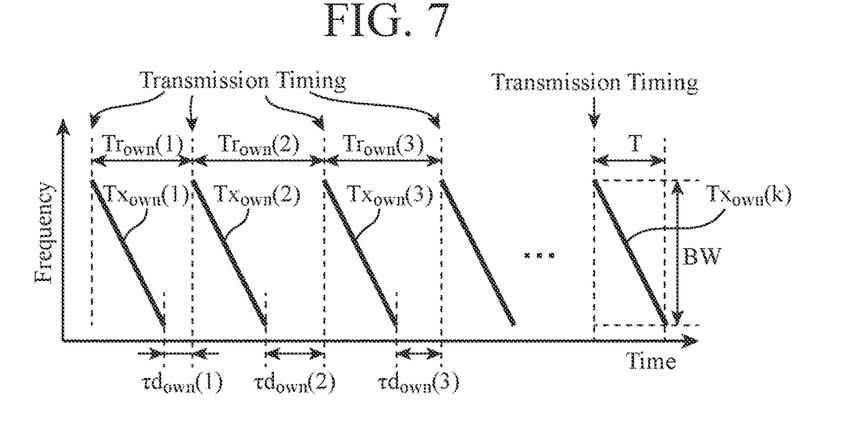
FIG. 7 is an explanatory diagram showing an example of a transmission chirp signal $Tx_{own}(n)$ outputted from a signal source 3.

FIG. 7 is an explanatory diagram showing an example of the transmission chirp signal $Tx_{own}(n)$ outputted from the signal source 3.

In FIG. 7, T is the sweep time of the transmission chirp signal $Tx_{own}(n)$, and the sweep time T is uniform.

BW is the frequency shift range of the transmission chirp signal $Tx_{own}(n)$.

The amount of delay $\tau d_{own}(n)$ is the delay time from when the signal source 3 outputs the transmission chirp signal $Tx_{own}(n)$ until the signal source 3 outputs a next transmission chirp signal $Tx_{own}(n+1)$, and the amount of delay $\tau d_{own}(n)$ is non-uniform.

The repetition period $Tr_{own}(n)$ is the sum time of the sweep time T and the amount of delay $\tau d_{own}(n)$, and the repetition period $Tr_{own}(n)$ is non-uniform.

Every time the splitting unit 5 receives the transmission chirp signal $Tx_{own}(n)$ from the signal source 3, the splitting unit 5 splits the transmission chirp signal $Tx_{own}(n)$ into two signals.

The splitting unit 5 outputs one split transmission chirp signal $Tx_{own}(n)$ to the transmission antenna 6, and outputs the other split transmission chirp signal $Tx_{own}(n)$ to the frequency mixing unit 9.

The transmission antenna 6 radiates the transmission chirp signal $Tx_{own}(n)$ outputted from the splitting unit 5, as an electromagnetic wave, into space.

The electromagnetic wave radiated from the transmission antenna 6 is reflected by an observation target.

The reception antenna 7 receives the electromagnetic wave reflected by the observation target, as a reflected wave, and outputs the received reflected wave as a reception chirp signal $Rx_{own}(n)$ to the frequency mixing unit 9.

Figure 8:
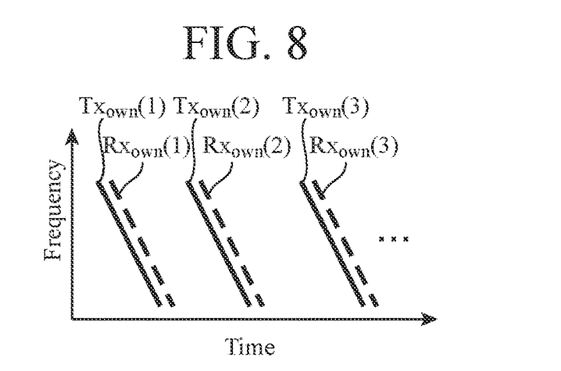
FIG. 8 is an explanatory diagram showing an example of the transmission chirp signal $Tx_{own}(n)$ and a reception chirp signal $Rx_{own}(n)$.

FIG. 8 is an explanatory diagram showing an example of the transmission chirp signal $Tx_{own}(n)$ and the reception chirp signal $Rx_{own}(n)$.

The reception chirp signal $Rx_{own}(n)$ is delayed by time $\tau_{ref}(n)$ represented by the following equation (1) relative to the transmission chirp signal $Tx_{own}(n)$. The time $\tau_{ref}(n)$ is directly proportional to the range from the radar device to the observation target.

$$\tau_{ref}(n) = \frac{2(R_{ref} + v_{ref} \cdot t)}{c} \quad (1)$$

In equation (1), $R_{ref}$ represents the initial value of the range to the observation target, $v_{ref}$ represents the relative velocity against the observation target, c represents radio wave speed, and t represents time.

The frequency mixing unit 9 mixes together the frequencies of the transmission chirp signal $Tx_{own}(n)$ outputted from the splitting unit 5 and the reception chirp signal $Rx_{own}(n)$ outputted from the reception antenna 7, and thereby generates a beat signal $S'b_{own}(n)$.

A frequency $F_{sb\_own}(n)$ of the beat signal $S'b_{own}(n)$ is represented by the following equation (2):

$$F_{sb\_own}(n) = \frac{BW}{T}\tau_{ref}(n) \quad (2)$$

Here, by the signal source 3 reducing the sweep time T of the transmission chirp signal $Tx_{own}(n)$, the time t decreases. The time t is, for example, a time in the order of microseconds.

The "$v_{ref} \cdot t$" in equation (1) is sufficiently smaller than the "$R_{ref}$" when the time t decreases and thus can be ignored.

Therefore, equation (2) can be approximated as shown in the following equation (3), and the frequency $F_{sb\_own}(n)$ of the beat signal $S'b_{own}(n)$ is constant:

$$F_{sb\_own}(n) \approx \frac{2BW \cdot R_{ref}}{c \cdot T} \quad (3)$$

The frequency mixing unit 9 outputs the beat signal $S'b_{own}(n)$ to the filter unit 10.

When the filter unit 10 receives the beat signal $S'b_{own}(n)$ from the frequency mixing unit 9, the filter unit 10 suppresses unwanted components such as noise included in the beat signal $S'b_{own}(n)$.

Figure 9:
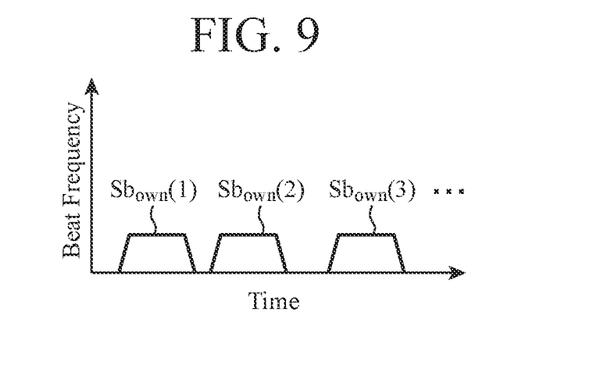
FIG. 9 is an explanatory diagram showing an example of a beat signal $Sb_{own}(n)$.

As shown in FIG. 9, the filter unit 10 outputs a beat signal $Sb_{own}(n)$ obtained after the suppression of unwanted components to the ADC 11.

FIG. 9 is an explanatory diagram showing an example of the beat signal $Sb_{own}(n)$.

When the ADC 11 receives the beat signal $Sb_{own}(n)$ from the filter unit 10, the ADC 11 converts the beat signal $Sb_{own}(n)$ into digital data $DSb_{own}(n)$ and outputs the digital data $DSb_{own}(n)$ to the signal processing unit 12.

When the signal processing unit 12 receives the digital data $DSb_{own}(n)$ from the ADC 11, the signal processing unit 12 calculates a range to the observation target from the digital data $DSb_{own}(n)$ in synchronization with transmission timing indicated by a control signal outputted from the timing controlling unit 2.

In addition, the signal processing unit 12 calculates a relative velocity against the observation target from the digital data $DSb_{own}(n)$.

Figure 10:
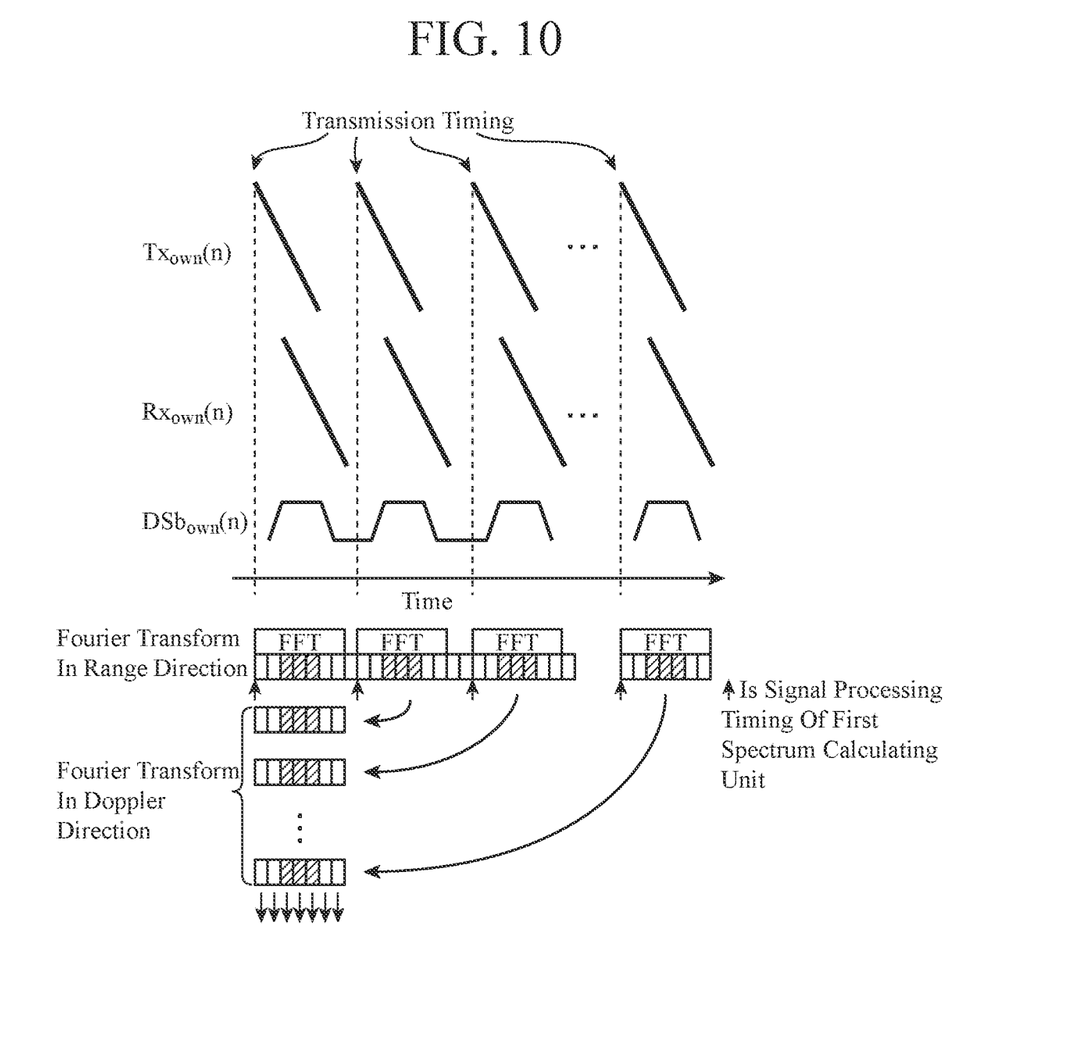
FIG. 10 is an explanatory diagram showing an overview of signal processing performed by the signal processing unit 12.

FIG. 10 is an explanatory diagram showing an overview of signal processing performed by the signal processing unit 12.

Figure 11:
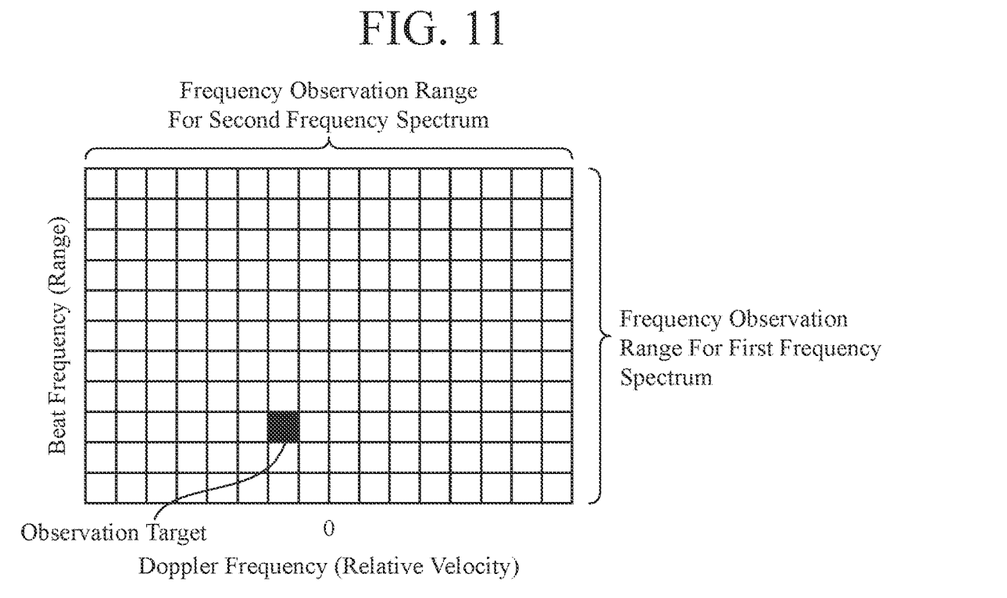
FIG. 11 is an explanatory diagram showing an example of a two-dimensional spectrum of beat frequency calculated by a first spectrum calculating unit 21 and Doppler frequency calculated by a second spectrum calculating unit 22.

FIG. 11 is an explanatory diagram showing an example of a two-dimensional spectrum of beat frequency calculated by the first spectrum calculating unit 21 and Doppler frequency calculated by the second spectrum calculating unit 22.

Signal processing performed by the signal processing unit 12 will be specifically described below by referring to FIGS. 10 and 11.

The first spectrum calculating unit 21 obtains digital data $DSb_{own}(n)$ corresponding to a transmission chirp signal $Tx_{own}(n)$ present in one period from the ADC 11 at each transmission timing indicated by a control signal outputted from the timing controlling unit 2.

The transmission timing indicated by the control signal corresponds to signal processing timing of the first spectrum calculating unit 21.

Then, as shown in FIG. 10, the first spectrum calculating unit 21 performs a Fourier transform on the digital data $DSb_{own}(n)$ corresponding to the transmission chirp signal $Tx_{own}(n)$ present in one period, in the range direction and thereby calculates a first frequency spectrum (step ST1 of FIG. 5). In FIG. 10, FFT represents a Fourier transform.

If there is no change in the range to the observation target at k signal processing timings, then, as shown in FIG. 11, spectral values are summed up to a frequency corresponding to the range to the observation target in a frequency observation range for the first frequency spectrum.

The first spectrum calculating unit 21 outputs the first frequency spectra to the second spectrum calculating unit 22.

Every time the second spectrum calculating unit 22 receives k first frequency spectra from the first spectrum calculating unit 21, the second spectrum calculating unit 22 performs a Fourier transform on the k first frequency spectra in the Doppler direction as shown in FIG. 10, and thereby calculates a second frequency spectrum (step ST2 of FIG. 5).

In the event that the second spectrum calculating unit 22 receives k first frequency spectra from the first spectrum calculating unit 21 m times, the second spectrum calculating unit 22 calculates m second frequency spectra. The "m" is an integer greater than or equal to 1.

If there is no change in the relative velocity against the observation target at (k×m) signal processing timings, spectral values are added up, as shown in FIG. 11, to a frequency corresponding to the relative velocity against the observation target in a frequency observation range for the second frequency spectrum.

The second spectrum calculating unit 22 outputs the first frequency spectra and the second frequency spectra to the range and velocity calculation processing unit 23.

When the range and velocity calculation processing unit 23 receives the first frequency spectra from the second spectrum calculating unit 22, the range and velocity calculation processing unit 23 detects peak values of spectral values of the first frequency spectra.

The range and velocity calculation processing unit 23 determines a frequency for the peak values to be a beat frequency, and calculates a range to the observation target from the beat frequency (step ST3 of FIG. 5).

The beat frequency corresponds to the frequency $F_{sb\_own}(n)$ represented by equation (3). A process itself of calculating range to the observation target from the beat frequency is a publicly known technique and thus a detailed description thereof is omitted.

When the range and velocity calculation processing unit 23 receives the second frequency spectra from the second spectrum calculating unit 22, the range and velocity calculation processing unit 23 detects peak values of spectral values of the second frequency spectra.

The range and velocity calculation processing unit 23 determines a frequency for the peak values to be a Doppler frequency $F_{v\_own}$, and calculates a relative velocity against the observation target from the Doppler frequency $F_{v\_own}$ (step ST3 of FIG. 5).

The Doppler frequency $F_{v\_own}$ is represented by the following equation (4):

$$F_{v\_own} = \frac{2f_{own} \cdot v_{ref}}{c} \quad (4)$$

In equation (4), $f_{own}$ is the center frequency of the transmission chirp signal $Tx_{own}(n)$.

A process itself of calculating a relative velocity against the observation target from the Doppler frequency $F_{v\_own}$ is a publicly known technique and thus a detailed description thereof is omitted.

Here, operation performed when a radar device different than the radar device shown in FIG. 1 transmits, as an interference wave, a transmission chirp signal $Tx_{ext}(n)$ similar to the transmission chirp signal $Tx_{own}(n)$ will be described.

The radar device shown in FIG. 1 is hereinafter referred to as an own radar device, and a radar device different than the radar device shown in FIG. 1 is hereinafter referred to as another (external) radar device.

Figure 12:
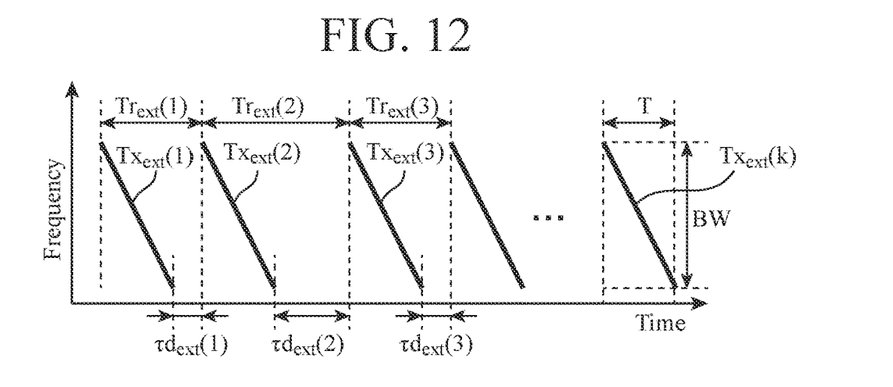
FIG. 12 is an explanatory diagram showing an example of a transmission chirp signal $Tx_{ext}(n)$ transmitted from another radar device.

FIG. 12 is an explanatory diagram showing an example of the transmission chirp signal $Tx_{ext}(n)$ transmitted from the another radar device.

In FIG. 12, the sweep time T of the transmission chirp signal $Tx_{ext}(n)$ is identical to the sweep time T of the transmission chirp signal $Tx_{own}(n)$ of the own radar device.

The frequency shift range BW of the transmission chirp signal $Tx_{ext}(n)$ is identical to the frequency shift range BW of the transmission chirp signal $Tx_{own}(n)$ of the own radar device.

The amount of delay $\tau d_{ext}(n)$ is the delay time from when the another radar device transmits the transmission chirp signal $Tx_{ext}(n)$ until the another radar device transmits a next transmission chirp signal $Tx_{ext}(n+1)$, and the amount of delay $\tau d_{ext}(n)$ is non-uniform.

The amount of delay $\tau d_{ext}(n)$ differs from the amount of delay $\tau d_{own}(n)$ of the own radar device.

A repetition period $Tr_{ext}(n)$ is the sum time of the sweep time T and the amount of delay $\tau d_{ext}(n)$, and the repetition period $Tr_{ext}(n)$ is non-uniform.

The repetition period $Tr_{ext}(n)$ differs from the repetition period $Tr_{own}(n)$ of the radar device.

Figure 13:
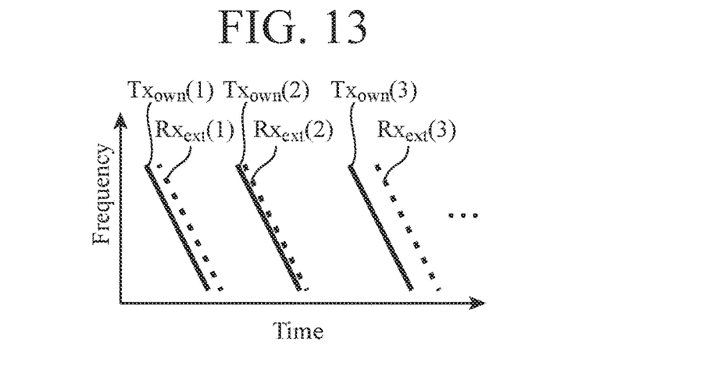
FIG. 13 is an explanatory diagram showing an example of a transmission chirp signal $Tx_{own}(n)$ transmitted from the radar device and a reception chirp signal $Rx_{ext}(n)$ which is a reception signal obtained when the radar device has received a transmission chirp signal $Tx_{ext}(n)$ from another radar device.

FIG. 13 is an explanatory diagram showing an example of a transmission chirp signal $Tx_{own}(n)$ transmitted from the own radar device and a reception chirp signal $Rx_{ext}(n)$ which is a reception signal obtained when the radar device has received a transmission chirp signal $Tx_{ext}(n)$ from the another radar device.

The reception chirp signal $Rx_{ext}(n)$ is delayed by time $\tau_{ext}(n)$ represented by the following equation (5) relative to the transmission chirp signal $Tx_{own}(n)$:

$$\tau_{ext}(n) = \begin{cases} \dfrac{R_{ext} + v_{ext} \cdot t}{c} & n = 1 \\ \dfrac{R_{ext} + v_{ext} \cdot t}{c} + \{\tau d_{own}(n-1) - \tau d_{ext}(n-1)\} & n = 2, 3, \ldots k \end{cases} \quad (5)$$

In equation (5), $R_{ext}$ represents the initial value of the range from the own radar device to the another radar device and $v_{ext}$ represents the relative velocity between the own radar device and the another radar device.

Figure 14:
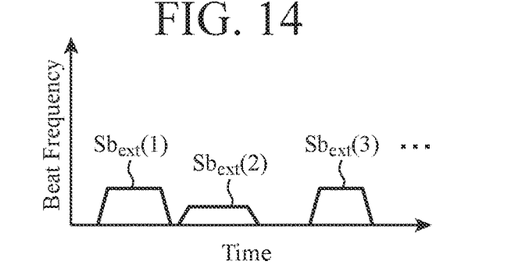
FIG. 14 is an explanatory diagram showing an example of a beat signal $Sb_{ext}(n)$ generated by mixing together the frequencies of the transmission chirp signal $Tx_{own}(n)$ and the reception chirp signal $Rx_{ext}(n)$.

FIG. 14 is an explanatory diagram showing an example of a beat signal $Sb_{ext}(n)$ which is generated by mixing together the frequencies of the transmission chirp signal $Tx_{own}(n)$ and the reception chirp signal $Rx_{ext}(n)$.

A frequency $F_{sb\_ext}(n)$ of the beat signal $Sb_{ext}(n)$ is represented by the following equation (6):

$$F_{sb\_ext}(n) = \frac{BW}{T} \tau_{ext}(n) \quad (6)$$

As the sweep time T of the transmission chirp signal $Tx_{ext}(n)$ transmitted from the another radar device decreases, the time t decreases.

The "$v_{ext} \cdot t$" in equation (5) is sufficiently smaller than the "$R_{ext}$" when the time t decreases and thus can be ignored.

Therefore, equation (6) can be approximated as shown in the following equation (7):

$$F_{sb\_ext}(n) \approx \begin{cases} \dfrac{2BW \cdot R_{ext}}{c} & n = 1 \\ \dfrac{2BW \cdot R_{ext}}{c \cdot T} + \dfrac{\{\tau d_{own}(n-1) - \tau d_{ext}(n-1)\}BW}{c \cdot T} & n = 2, 3, \ldots k \end{cases} \quad (7)$$

Since the repetition period $Tr_{own}(n)$ of the own radar device differs from the repetition period $Tr_{ext}(n)$ of another radar device, the frequency $F_{sb\_ext}(n)$ of the beat signal $Sb_{ext}(n)$ varies depending on repetition period.

Therefore, even when the first spectrum calculating unit 21 calculates first frequency spectra at k signal processing timings, spectral values are not summed up to a frequency corresponding to the range to the another radar device.

In addition, even when the second spectrum calculating unit 22 calculates m second frequency spectra, spectral values are not summed up to a frequency corresponding to the relative velocity against the another radar device.

Therefore, even when the range to the observation target is one-half of the range to the another radar device, spectral values of the second frequency spectra do not serve as large floor noise for the spectral value of a Doppler frequency corresponding to the relative velocity against the observation target.

In the above-described first embodiment, the radar device is configured to include the radar signal outputting unit 1 that repeatedly outputs radar signals whose frequency changes with the passage of time, at a non-uniform repetition period. Therefore, the radar device can calculate the relative velocity against an observation target by avoiding a situation in which floor noise increases.

Second Embodiment

In the radar device of the first embodiment, the radar signal outputting unit 1 repeatedly outputs a transmission chirp signal $Tx_{own}(n)$, which is a radar signal, to the transmitting and receiving unit 4 at a non-uniform repetition period $Tr_{own}(n)$.

A second embodiment describes a radar device in which the radar signal outputting unit 1 determines a change range of a repetition period $Tr_{own}(n)$ and repeatedly outputs a transmission chirp signal $Tx_{own}(n)$ to the transmitting and receiving unit 4 at a repetition period $Tr_{own}(n)$ that changes non-uniformly in the determined change range.

A configuration diagram of the radar device of the second embodiment is shown in FIG. 1 as with the radar device of the first embodiment.

The influence of phase noise occurring when the second spectrum calculating unit 22 calculates m second frequency spectra can be ignored if an amount of phase variation $P_{v\_own}$ of a transmission chirp signal $Tx_{own}(n)$, which is repeatedly outputted from the radar signal outputting unit 1, is less than or equal to, for example, 0.1 (rad RMS).

If the amount of phase variation $P_{v\_own}$ of the transmission chirp signal $Tx_{own}(n)$ is less than or equal to, for example, 0.1 (rad RMS), peak values of spectral values of the m second frequency spectra are added up at the same frequency, and thus, the influence of phase noise can be ignored. If the influence of phase noise is made smaller, the loss associated with the phase noise is made smaller.

The amount of phase variation $P_{v\_own}$ can be represented by the following equation (8):

$$P_{v\_own} = \frac{2f_{own} \cdot v_{ref} \cdot \tau d_{own\_rms}}{c} \quad (8)$$

In equation (8), $\tau d_{own\_rms}$ is the root mean square of the amount of delay $\tau d_{own}(n)$.

In order that the influence of phase noise can be ignored, the timing controlling unit 2 in the radar signal outputting unit 1 calculates, using equation (8), the root mean square $\tau d_{own\_rms}$ of the amount of delay $\tau d_{own}(n)$ at which the amount of phase variation $P_{v\_own}$ is, for example, less than or equal to 0.1 (rad RMS).

Then, the timing controlling unit 2 calculates the amount of delay $\tau d_{own}(n)$ from the root mean square $\tau d_{own\_rms}$ and adds the amount of delay $\tau d_{own}(n)$ to sweep time T, and thereby calculates a repetition period $Tr_{own}(n)$.

The timing controlling unit 2 determines the calculated repetition period $Tr_{own}(n)$ to be an upper limit $Tr_{max}$ of a change range of the repetition period $Tr_{own}(n)$.

Here, the timing controlling unit 2 calculates the root mean square $\tau d_{own\_rms}$ of the amount of delay $\tau d_{own}(n)$ at which the amount of phase variation $P_{v\_own}$ is less than or equal to 0.1 (rad RMS). The amount of phase variation $P_{v\_own}$ may be any amount of phase variations at which the influence of phase noise can be roughly ignored. Accordingly, the timing controlling unit 2 may calculate the root mean square $\tau d_{own\_rms}$ of the amount of delay $\tau d_{own}(n)$ at which the amount of phase variation $P_{v\_own}$ is, for example, 0.12 (rad RMS).

The own radar device receives a transmission chirp signal $Tx_{ext}(n)$ transmitted from the another radar device, as a reception chirp signal $Rx_{ext}(n)$, and generates a beat signal $Sb_{ext}(n)$. At this time, when the maximum value of the frequency $F_{sb\_ext}(n)$ of the beat signal $Sb_{ext}(n)$ is, for example, greater than or equal to sampling frequency, frequencies to which spectral values are summed up when second frequency spectra are calculated are spread over the entire frequency observation range for the second frequency spectrum.

By the frequencies to which spectral values are summed up being spread over the entire frequency observation range, the spectral values of frequencies other than a Doppler frequency related to an observation target decrease, and thus, the accuracy of detection of a peak value corresponding to the Doppler frequency related to the observation target improves. Therefore, the accuracy of calculation of the relative velocity against the observation target improves over the radar device of the first embodiment.

In order that the frequencies to which spectral values are summed up are spread over the entire frequency observation range, the timing controlling unit 2 calculates the amount of delay $\tau d_{own}(n)$ at which the maximum value of the frequency $F_{sb\_ext}(n)$ is, for example, greater than or equal to sampling frequency.

Namely, the timing controlling unit 2 searches for the amount of delay $\tau d_{own}(n)$ at which the maximum value of the frequency $F_{sb\_ext}(n)$ shown in equation (7) is greater than or equal to sampling frequency.

Then, the timing controlling unit 2 adds the calculated amount of delay $\tau d_{own}(n)$ to sweep time T and thereby calculates a repetition period $Tr_{own}(n)$.

The timing controlling unit 2 determines the calculated repetition period $Tr_{own}(n)$ to be a lower limit $Tr_{min}$ of the change range of the repetition period $Tr_{own}(n)$.

Here, the timing controlling unit 2 calculates the amount of delay $\tau d_{own}(n)$ at which the maximum value of the frequency $F_{sb\_ext}(n)$ is greater than or equal to the sampling frequency. It is sufficient for the frequencies to which spectral values are summed up are roughly spread over the entire frequency observation range. Thus, the timing controlling unit 2 may calculate the amount of delay $\tau d_{own}(n)$ at which the maximum value of the frequency $F_{sb\_ext}(n)$ is greater than or equal to a frequency smaller by a few percent than the sampling frequency.

The timing controlling unit 2 determines a range from the lower limit $Tr_{min}$ to the upper limit $Tr_{max}$ to be the change range of the repetition period $Tr_{own}(n)$.

The timing controlling unit 2 outputs a control signal indicating transmission timing that changes in the determined change range of the repetition period $Tr_{own}(n)$ to each of the signal source 3 and the signal processing unit 12.

In the above-described second embodiment, the radar signal outputting unit 1 determines a change range of a repetition period on the basis of both the amount of phase variation for radar signals which are repeatedly outputted at a non-uniform repetition period, and a frequency which is a difference between the frequency of the radar signal and the frequency of a radar signal from another radar device which is received by the transmitting and receiving unit 4. Then, the radar device is configured in such a manner that the radar signal outputting unit 1 repeatedly outputs a radar signal at a repetition period that changes non-uniformly in the determined change range. Therefore, the radar device can reduce the influence of phase noise and improve the accuracy of calculation of the relative velocity against an observation target over the radar device of the first embodiment.

Third Embodiment

A third embodiment describes a radar device in which the radar signal outputting unit 1 determines a change range of a repetition period on the basis of both an amount of phase variations of a radar signal which is repeatedly outputted at a non-uniform repetition period, and a relative velocity against an observation target which is obtained when a radar signal is repeatedly outputted at a uniform repetition period.

Figure 15:
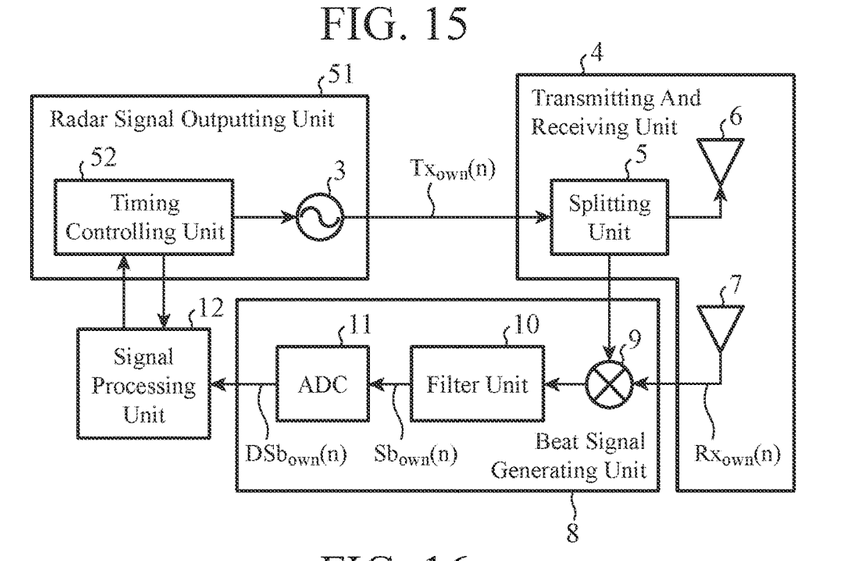
FIG. 15 is a configuration diagram showing a radar device according to a third embodiment.

FIG. 15 is a configuration diagram showing a radar device of the third embodiment.

In FIG. 15, the same reference signs as those of FIG. 1 indicate the same or corresponding portions and thus description thereof is omitted.

A radar signal outputting unit 51 includes a timing controlling unit 52 and the signal source 3.

As with the radar signal outputting unit 1 shown in FIG. 1, the radar signal outputting unit 51 repeatedly outputs a transmission chirp signal $Tx_{own}(n)$ to the splitting unit 5 at a non-uniform repetition period $Tr_{own}(n)$.

The radar signal outputting unit 51 determines a change range of the repetition period $Tr_{own}(n)$ on the basis of both an amount of phase variations $P_{v\_own}$ of the transmission chirp signal $Tx_{own}(n)$ and a relative velocity against an observation target which is obtained when a transmission chirp signal $Tx_{own}(n)$ is repeatedly outputted at a uniform repetition period.

The timing controlling unit 52 obtains a relative velocity against the observation target which is calculated by the range and velocity calculation processing unit 23 when a transmission chirp signal $Tx_{own}(n)$ is repeatedly outputted to the signal source 3 at a uniform repetition period.

The timing controlling unit 52 determines a change range of the repetition period $Tr_{own}(n)$ on the basis of both the amount of phase variations $P_{v\_own}$ of the transmission chirp signal $Tx_{own}(n)$ and the obtained relative velocity.

The timing controlling unit 52 outputs a control signal indicating transmission timing that changes in the determined change range of the repetition period $Tr_{own}(n)$ to each of the signal source 3 and the signal processing unit 12.

Next, operations of the radar device shown in FIG. 15 will be described.

In the radar device shown in FIG. 15, before starting the same operation as that of the radar device shown in FIG. 1, the radar signal outputting unit 51 repeatedly outputs a radar signal to the transmitting and receiving unit 4 at a uniform repetition period $Tr_{own}(n)$ so that a relative velocity against an observation target can be obtained.

Namely, the timing controlling unit 52 sets a uniform repetition period $Tr_{own}(n)$, and outputs a control signal indicating transmission timing of a transmission chirp signal to each of the signal source 3 and the signal processing unit 12 at the uniform repetition period $Tr_{own}(n)$.

When the signal source 3 receives the control signal from the timing controlling unit 52, the signal source 3 outputs a transmission chirp signal $Tx_{own}(n)$ to the splitting unit 5 at each transmission timing indicated by the control signal.

Operations of the transmitting and receiving unit 4 and the beat signal generating unit 8 do not vary between when the repetition period $Tr_{own}(n)$ is uniform and when the repetition period $Tr_{own}(n)$ is non-uniform, and thus, a detailed description thereof is omitted.

As in the first embodiment, every time the second spectrum calculating unit 22 receives k first frequency spectra from the first spectrum calculating unit 21, the second spectrum calculating unit 22 performs a Fourier transform on the k first frequency spectra in the Doppler direction, and thereby calculates a second frequency spectrum.

When the second spectrum calculating unit 22 receives k first frequency spectra from the first spectrum calculating unit 21 m times, the second spectrum calculating unit 22 calculates m second frequency spectra.

The second spectrum calculating unit 22 outputs the first frequency spectra and the second frequency spectra to the range and velocity calculation processing unit 23.

When the range and velocity calculation processing unit 23 receives the second frequency spectra from the second spectrum calculating unit 22, as in the first embodiment, the range and velocity calculation processing unit 23 detects peak values of spectral values of the second frequency spectra.

The range and velocity calculation processing unit 23 determines a frequency for the peak values to be a Doppler frequency, calculates a relative velocity against the observation target from the Doppler frequency, and outputs the relative velocity to the timing controlling unit 52.

When the timing controlling unit 52 receives the relative velocity against the observation target from the range and velocity calculation processing unit 23, the timing controlling unit 52 sets the relative velocity to the "$(f_{own} \cdot v_{ref})/c$" shown in equation (8).

Then, in order that the influence of phase noise can be ignored, as with the timing controlling unit 2 of the second embodiment, the timing controlling unit 52 calculates the root mean square $\tau d_{own\_rms}$ of the amount of delay $\tau d_{own}(n)$, using equation (8).

Then, the timing controlling unit 52 calculates the amount of delay $\tau d_{own}(n)$ from the root mean square $\tau d_{own\_rms}$, and adds the amount of delay $\tau d_{own}(n)$ to sweep time T and thereby calculates a repetition period $Tr_{own}(n)$.

The timing controlling unit 52 determines the calculated repetition period $Tr_{own}(n)$ to be an upper limit $Tr_{max}$ of a change range of the repetition period $Tr_{own}(n)$.

In addition, the timing controlling unit 52 determines a lower limit $Tr_{min}$ of the change range of the repetition period $Tr_{own}(n)$ by the same method as that used by the timing controlling unit 2 of the second embodiment.

As with the timing controlling unit 2 of the second embodiment, the timing controlling unit 52 determines a range from the lower limit $Tr_{min}$ to the upper limit $Tr_{max}$ to be the change range of the repetition period $Tr_{own}(n)$.

The timing controlling unit 52 outputs a control signal indicating transmission timing that changes in the determined change range of the repetition period $Tr_{own}(n)$ to each of the signal source 3 and the signal processing unit 12.

Subsequent operations of the radar device are the same as those of the radar device shown in FIG. 1 and thus description thereof is omitted.

In the above-described third embodiment, the radar signal outputting unit 51 determines a change range of a repetition period on the basis of both the amount of phase variations of a radar signal which is repeatedly outputted at a non-uniform repetition period, and the relative velocity against an observation target which is obtained when a radar signal is repeatedly outputted at a uniform repetition period. Then, the radar device is configured in such a manner that the radar signal outputting unit 51 repeatedly outputs a radar signal at a repetition period that changes non-uniformly in the determined change range. Therefore, the radar device can reduce the influence of phase noise and improve the accuracy of calculation of the relative velocity against the observation target over the radar device of the first embodiment.

Fourth Embodiment

A fourth embodiment describes a radar device in which a second spectrum calculating unit 62 compensates for phase variations of k first frequency spectra which are outputted from the first spectrum calculating unit 21, and performs a Fourier transform on the k variation-compensated first frequency spectra in the Doppler direction.

Figure 16:
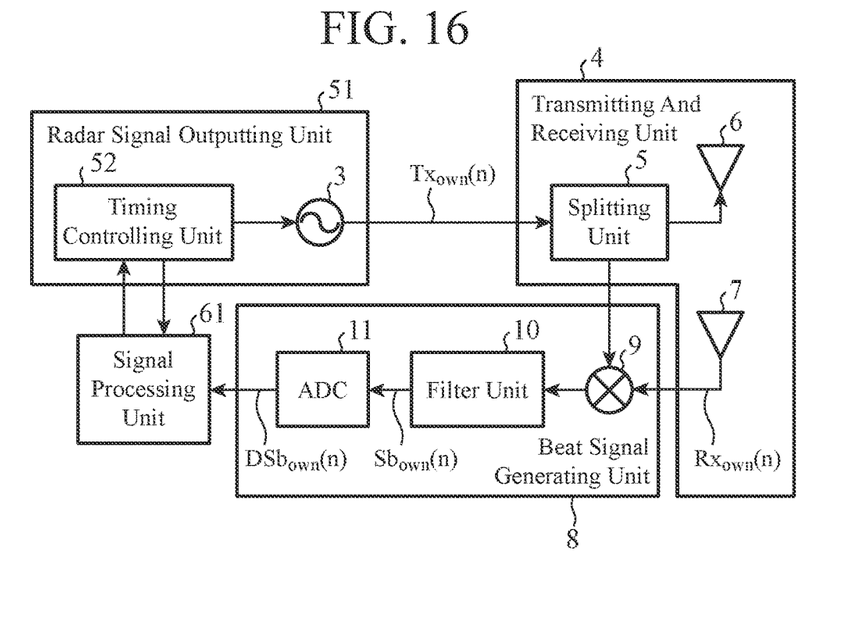
FIG. 16 is a configuration diagram showing a radar device according to a fourth embodiment.

FIG. 16 is a configuration diagram showing the radar device of the fourth embodiment.

In FIG. 16, the same reference signs as those of FIGS. 1 and 15 indicate the same or corresponding portions and thus description thereof is omitted.

A signal processing unit 61 includes the first spectrum calculating unit 21, the second spectrum calculating unit 62, and the range and velocity calculation processing unit 23.

As with the signal processing unit 12 shown in FIGS. 1 and 15, the signal processing unit 61 performs a process of calculating range to an observation target in synchronization with transmission timing indicated by a control signal outputted from the timing controlling unit 52.

The signal processing unit 61 compensates for phase variations of k first frequency spectra outputted from the first spectrum calculating unit 21.

The signal processing unit 61 performs a process of calculating a second frequency spectrum by performing a Fourier transform on the k variation-compensated first frequency spectra in the Doppler direction, and calculating a relative velocity against the observation target from the second frequency spectrum.

Figure 17:
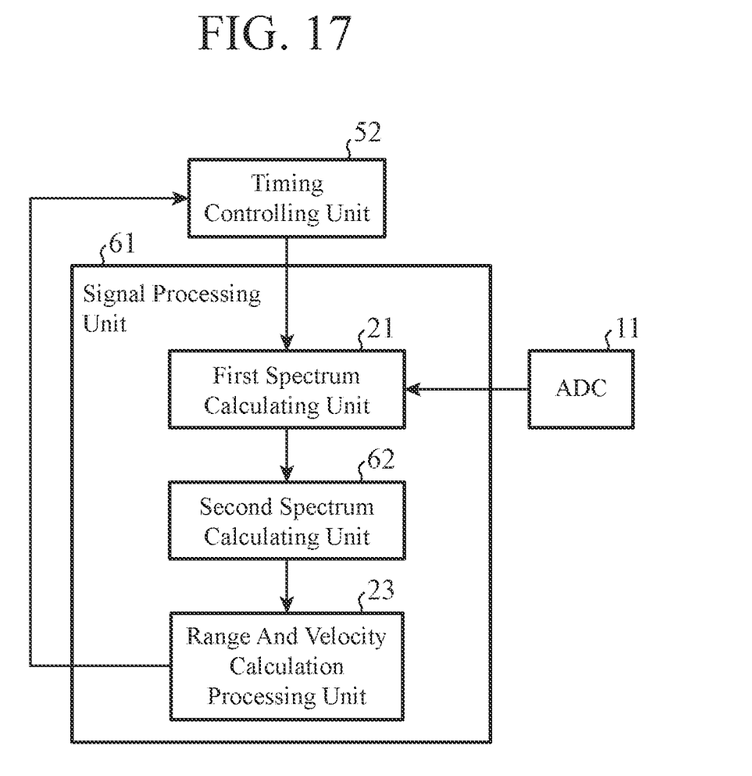
FIG. 17 is a configuration diagram showing the inside of a signal processing unit 61.

FIG. 17 is a configuration diagram showing the inside of the signal processing unit 61.

In FIG. 17, the same reference signs as those of FIG. 2 indicate the same or corresponding portions and thus description thereof is omitted.

The second spectrum calculating unit 62 is implemented by, for example, the spectrum calculating circuitry 32 shown in FIG. 3.

The second spectrum calculating unit 62 obtains a relative velocity which is calculated by the range and velocity calculation processing unit 23 when a transmission chirp signal $Tx_{own}(n)$ is repeatedly outputted from the radar signal outputting unit 51 at a uniform repetition period.

The second spectrum calculating unit 62 compensates for phase variations of k first frequency spectra outputted from the first spectrum calculating unit 21, on the basis of the obtained relative velocity.

The second spectrum calculating unit 62 performs a process of calculating a second frequency spectrum by performing a Fourier transform on the k variation-compensated first frequency spectra in the Doppler direction, and outputting the second frequency spectrum to the range and velocity calculation processing unit 23.

Next, the radar device shown in FIG. 16 will be described.

In the radar device shown in FIG. 16, before starting the same operations as those of the radar device shown in FIG. 1, the radar signal outputting unit 51 repeatedly outputs a radar signal to the transmitting and receiving unit 4 at a uniform repetition period $Tr_{own}(n)$ so that a relative velocity against an observation target can be obtained.

Namely, the timing controlling unit 52 sets a uniform repetition period $Tr_{own}(n)$, and outputs a control signal indicating transmission timing of a transmission chirp signal to each of the signal source 3 and the signal processing unit 61 at the uniform repetition period $Tr_{own}(n)$.

When the signal source 3 receives the control signal from the timing controlling unit 52, the signal source 3 outputs a transmission chirp signal $Tx_{own}(n)$ to the splitting unit 5 at each transmission timing indicated by the control signal.

Operations of the transmitting and receiving unit 4 and the beat signal generating unit 8 do not vary between when the repetition period $Tr_{own}(n)$ is uniform and when the repetition period $Tr_{own}(n)$ is non-uniform, and thus, a detailed description thereof is omitted.

Every time the second spectrum calculating unit 62 receives k first frequency spectra from the first spectrum calculating unit 21, the second spectrum calculating unit 62 performs a Fourier transform on the k first frequency spectra in the Doppler direction, and thereby calculates a second frequency spectrum.

When the second spectrum calculating unit 62 receives k first frequency spectra from the first spectrum calculating unit 21 m times, the second spectrum calculating unit 62 calculates m second frequency spectra.

The second spectrum calculating unit 62 outputs the m second frequency spectra to the range and velocity calculation processing unit 23.

When the range and velocity calculation processing unit 23 receives the second frequency spectra from the second spectrum calculating unit 62, as in the first embodiment, the range and velocity calculation processing unit 23 detects peak values of spectral values of the second frequency spectra.

The range and velocity calculation processing unit 23 determines a frequency for the peak values to be a Doppler frequency, calculates a relative velocity against the observation target from the Doppler frequency, and outputs the relative velocity to each of the timing controlling unit 52 and the second spectrum calculating unit 62.

When the timing controlling unit 52 receives the relative velocity against the observation target from the range and velocity calculation processing unit 23, as in the third embodiment, the timing controlling unit 52 determines a change range of the repetition period $Tr_{own}(n)$.

The timing controlling unit 52 outputs a control signal indicating transmission timing that changes in the determined change range of the repetition period $Tr_{own}(n)$ to each of the signal source 3 and the signal processing unit 61.

When the signal source 3 receives the control signal from the timing controlling unit 52, the signal source 3 outputs a transmission chirp signal $Tx_{own}(n)$ to the splitting unit 5 at each transmission timing indicated by the control signal.

Subsequent operations of the transmitting and receiving unit 4, the beat signal generating unit 8, the first spectrum calculating unit 21, and the range and velocity calculation processing unit 23 are the same as those of the first embodiment and thus a detailed description thereof is omitted.

The second spectrum calculating unit 62 obtains the relative velocity which is calculated by the range and velocity calculation processing unit 23 when a transmission chirp signal $Tx_{own}(n)$ is repeatedly outputted from the radar signal outputting unit 51 at a uniform repetition period.

Every time the second spectrum calculating unit 62 receives k first frequency spectra from the first spectrum calculating unit 21, the second spectrum calculating unit 62 compensates for phase variations of the k first frequency spectra outputted from the first spectrum calculating unit 21, on the basis of the obtained relative velocity.

A process of compensating for phase variations by the second spectrum calculating unit 62 will be specifically described below.

The second spectrum calculating unit 62 calculates a duration $T_D(n)$ during which a first frequency spectrum is outputted from the first spectrum calculating unit 21, on the basis of the obtained relative velocity.

Then, the second spectrum calculating unit 62 adds the duration $T_D(n)$ during which the first frequency spectrum is outputted to the amount of delay $\tau d_{own}(n)$, and thereby detects a timing of the beginning of the first frequency spectrum.

The second spectrum calculating unit 62 compensates for phase variations of the first frequency spectrum in such a manner that the beginning of the first frequency spectrum outputted from the first spectrum calculating unit 21 matches the detected timing of the beginning.

The second spectrum calculating unit 62 performs a Fourier transform on the k variation-compensated first frequency spectra in the Doppler direction and thereby calculates a second frequency spectrum.

When the second spectrum calculating unit 62 receives k first frequency spectra from the first spectrum calculating unit 21 m times, the second spectrum calculating unit 62 calculates m second frequency spectra.

The second spectrum calculating unit 62 outputs the second frequency spectra to the range and velocity calculation processing unit 23.

When the range and velocity calculation processing unit 23 receives the second frequency spectra from the second spectrum calculating unit 62, as in the first embodiment, the range and velocity calculation processing unit 23 detects peak values of spectral values of the second frequency spectra.

The range and velocity calculation processing unit 23 determines a frequency for the peak values to be a Doppler frequency, and calculates a relative velocity against the observation target from the Doppler frequency.

In the above-described fourth embodiment, the second spectrum calculating unit 62 compensates for phase variations of first frequency spectra calculated by the first spectrum calculating unit 21, on the basis of the relative velocity obtained when a radar signal is repeatedly outputted from the radar signal outputting unit 51 at a uniform repetition period. Then, the radar device is configured in such a manner that the second spectrum calculating unit 62 performs a Fourier transform on the variation-compensated first frequency spectra in the Doppler direction and thereby calculates a second frequency spectrum. Therefore, the radar device can reduce errors in adding up second frequency spectra associated with phase variations of first frequency spectra calculated by the first spectrum calculating unit 21.

Note that in the invention of this application, a free combination of the embodiments, modifications to any component of the embodiments, or omissions of any component in the embodiments are possible within the scope of the invention.

INDUSTRIAL APPLICABILITY

The invention is suitable for a radar device that calculates relative velocity against an observation target.

REFERENCE SIGNS LIST

1: radar signal outputting unit, 2: timing controlling unit, 3: signal source, 4: transmitting and receiving unit, 5: splitting unit, 6: transmission antenna, 7: reception antenna, 8: beat signal generating unit, 9: frequency mixing unit, 10: filter unit, 11: ADC, 12: signal processing unit, 21: first spectrum calculating unit, 22: second spectrum calculating unit, 23: range and velocity calculation processing unit, 31: spectrum calculating circuitry, 32: spectrum calculating circuitry, 33: range and velocity calculation processing circuitry, 41: memory, 42: processor, 51: radar signal outputting unit, 52: timing controlling unit, 61: signal processing unit, and 62: second spectrum calculating unit

The invention claimed is:

1. A radar device comprising:
processing circuitry
to repeatedly output radar signals whose frequency changes with passage of time, at a non-uniform repetition period;
to transmit each output radar signal outputted to an observation target, and receive each radar signal reflected by the observation target as a reflected wave;
to generate a plurality of beat signals each having a frequency, the frequency being a difference between a frequency of each outputted radar signal and a frequency of a corresponding reflected wave; and
to calculate a Doppler frequency from the plurality of beat signals, and calculate a relative velocity against the observation target from the Doppler frequency,
wherein the processing circuitry is configured to determine a change range of the non-uniform repetition period on a basis of both an amount of phase variation for a radar signal to be repeatedly outputted at the non-uniform repetition period and a frequency that is a difference between a frequency of the radar signal and a frequency of a radar signal from another radar device, and repeatedly output a radar signal at the non-uniform repetition period that changes non-uniformly in the determined change range.

2. The radar device according to claim 1, wherein the processing circuitry is configured to calculate a frequency of each generated beat signal, and calculate a range to the observation target from the frequency of each generated beat signal.

3. The radar device according to claim 2, wherein the processing circuitry is further configured to:
calculate a first frequency spectrum by performing a Fourier transform on each generated beat signal in a range direction;
calculate a second frequency spectrum by performing a Fourier transform on the calculated first frequency spectrum in a Doppler direction; and
calculate a range to the observation target from a frequency for peak values of spectral values of the calculated first frequency spectrum, and calculate a relative velocity against the observation target from a frequency corresponding to a peak value of spectral values of the calculated second frequency spectrum.

4. The radar device according to claim 3, wherein
the processing circuitry is configured to repeatedly output radar signals at a uniform repetition period when no interference occurs from other radar devices, and
the processing circuitry is configured to compensate for phase variations of the calculated first frequency spectrum when interference occurs from other radar devices, on a basis of a relative velocity against the observation target, and calculate a second frequency spectrum by performing a Fourier transform on the variation-compensated first frequency spectrum in the Doppler direction, the relative velocity being obtained when a radar signal is repeatedly outputted at the uniform repetition period.

5. a radar device that repeatedly outputs radar signals at a uniform repetition period when no interference occurs from other radar devices, comprising:
processing circuitry
to repeatedly output radar signals whose frequency changes with passage of time, at a non-uniform repetition period when interference occurs from other radar devices;
to transmit each output radar signal to an observation target, and receive each radar signal reflected by the observation target as a reflected wave;
to generate a plurality of beat signals each having a frequency, the frequency being a difference between a frequency of each outputted radar signal and a frequency of a corresponding reflected wave; and
to calculate a Doppler frequency from the plurality of beat signals, and calculate a relative velocity against the observation target from the Doppler frequency,
wherein the processing circuitry is configured to determine a change range of the non-uniform repetition period on a basis of both an amount of phase variation for a radar signal to be repeatedly outputted at the non-uniform repetition period and a relative velocity against the observation target, and repeatedly output a radar signal at the non-uniform repetition period that changes non-uniformly in the determined change range, the relative velocity being obtained in advance when a radar signal is repeatedly outputted at the uniform repetition period.

6. The radar device according to claim 5, wherein the processing circuitry is configured to calculate a frequency of each generated beat signal, and calculate a range to the observation target from the frequency of each generated beat signal.

7. The radar device according to claim 6, wherein the processing circuitry is further configured to:
calculate a first frequency spectrum by performing a Fourier transform on each generated beat signal in a range direction;
calculate a second frequency spectrum by performing a Fourier transform on the calculated first frequency spectrum in a Doppler direction; and
calculate a range to the observation target from a frequency for peak values of spectral values of the calculated first frequency spectrum, and calculate a relative velocity against the observation target from a frequency corresponding to a peak value of spectral values of the calculated second frequency spectrum.

8. The radar device according to claim 7, wherein the processing circuitry is configured to compensate for phase variations of the calculated first frequency spectrum, on a basis of a relative velocity against the observation target, and calculate a second frequency spectrum by performing a Fourier transform on the variation-compensated first frequency spectrum in the Doppler direction.

* * * * *